May 3, 1938. W. C. CARD, JR 2,115,800
APPARATUS FOR THE MANUFACTURE OF WELTED SHOES
Filed Aug. 23, 1935    2 Sheets-Sheet 1
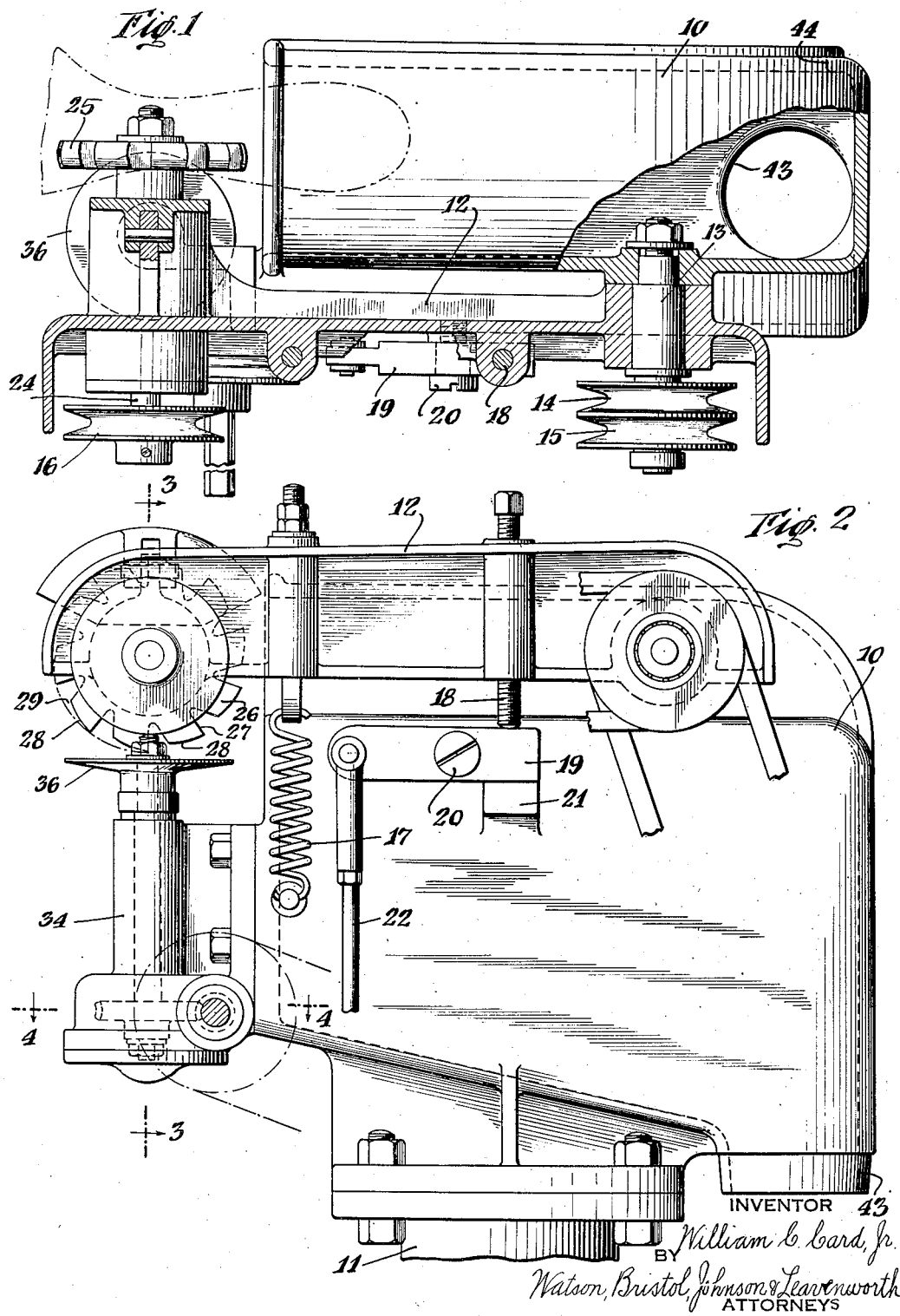

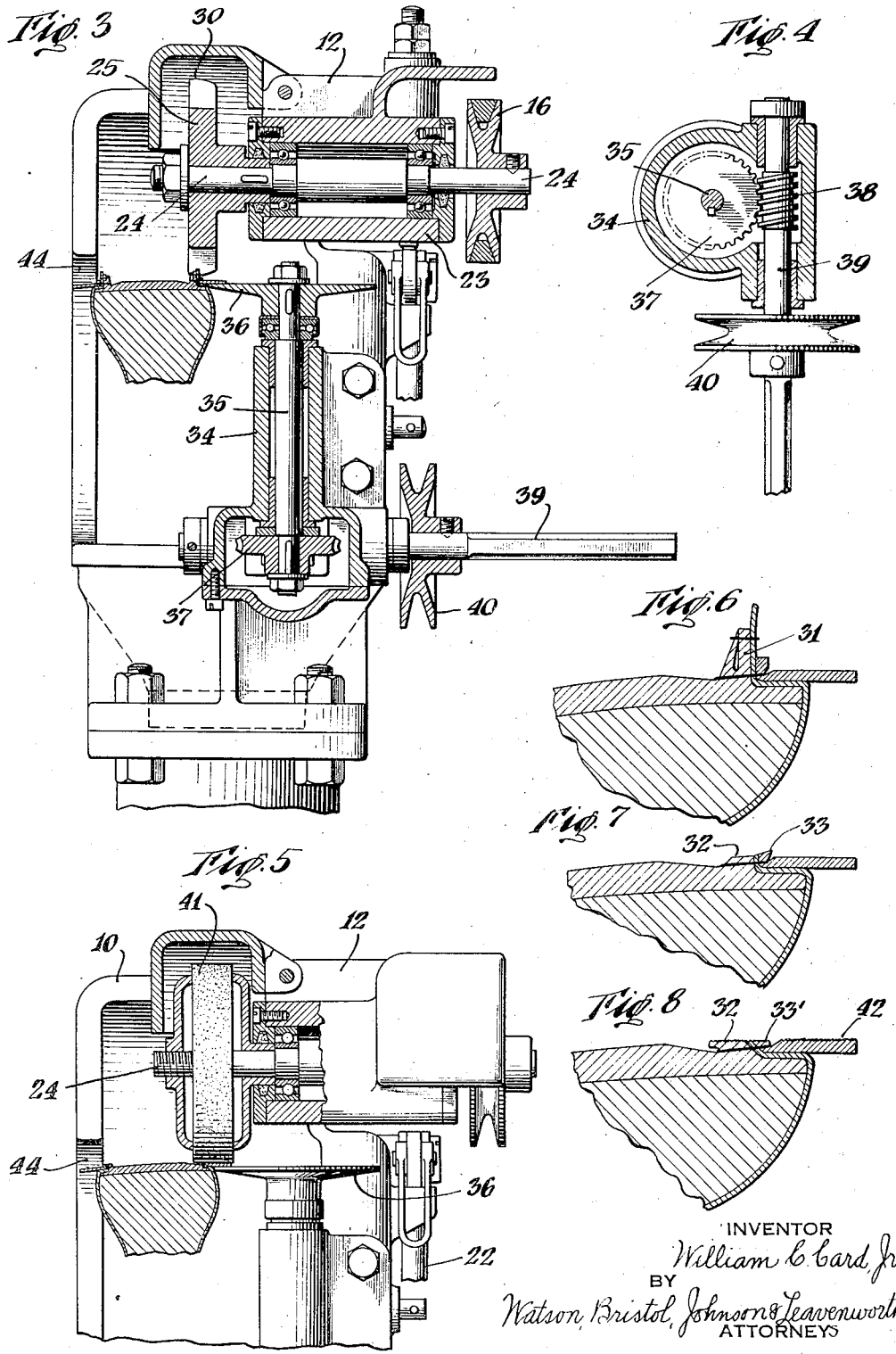

Patented May 3, 1938

2,115,800

UNITED STATES PATENT OFFICE 2,115,800

APPARATUS FOR THE MANUFACTURE OF WELTED SHOES

William C. Card, Jr., Winthrop, Mass., assignor to Compo Shoe Machinery Corporation, New York, N. Y., a corporation of Delaware Application August 23, 1935, Serial No. 37,417

5 Claims. (Cl. 12—82)

This invention relates to the manufacture of welted shoes, and more particularly to the making of such shoes wherein the outsole is affixed to the welted upper by means of cement.

General objects of the invention are to provide an improved apparatus for and method of making welted shoes having cement affixed outsoles.

More particularly, the objects of the invention are to provide a series of novel shoemaking steps for producing a welted shoe having a cement attached sole, in which the inseam is very closely trimmed and the inseam and welt portion of the upper are treated to assure an effective cement bond with an outsole.

A further object of the invention is to provide apparatus which is especially fitted for carrying out the above method, and which is rugged in construction and simple in operation and is capable of giving better inseam trimming and welt preparing results than machines heretofore used in the preparation of sewed welt shoes.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

Fig. 1 is a top plan view of the machine used in carrying out certain steps of the method of the present invention, parts thereof being shown in section better to illustrate the construction;

Fig. 2 is a fragmentary side elevation of the machine shown in Fig. 1, parts thereof being broken away;

Fig. 3 is a fragmentary transverse vertical view taken along line 3—3 of Fig. 2;

Fig. 4 is a fragmentary horizontal sectional view taken along the line 4—4 of Fig. 2;

Fig. 5 is a fragmentary front elevation of a machine similar to that of Fig. 3 but showing a tool for a different operation mounted thereon; and Figs. 6, 7 and 8 are fragmentary transverse sections through the inseam portion of a shoe constructed in accordance with the present invention, and showing different stages in the inseam and welt treating operations.

In accordance with the present invention it is proposed to make welted shoes having a welted upper which is lasted substantially in accordance with conventional methods heretofore used to produce the Goodyear welt type of upper, to which the outsole is affixed by cement in a suitable sole affixing press. Such a construction has various advantages over a shoe in which the outsole is sewed to the welt, such as the elimination of the stitch channel at the bottom of the outsole, which is bound to become peely after the shoe has been worn for a short time, and the elimination of extra sole leveling and conforming operations which may, in the case of a cement attached sole, be cared for at the time the sole is under pressure in the shoe press, together with the usual advantages as to ease, reduced consumption of the operator's time, and economy of cement sole affixing as compared with stitching.

The present invention also provides a very close trim at the inseam which especially well fits the shoe for cement sole affixation and materially reduces the amount of filler material needed between the insole and outsole and also provides a more flexible construction. The method for obtaining this superior inseam condition comprises removing the excess lasting materials at the inseam by means of a rapidly rotating heavy chipping or rasping tool which is capable of approaching the inseam stitching much more closely than the slicing knives or saws heretofore generally used for such work. This tool is also of such a nature that it has a knocking or beating flattening effect as well as a rasping or chipping action, so that by virtue of its combined actions it gives a very close trim. Following this step, the trimmed inseam and the welt are roughed by a rotatable wire bristle wheel which raises a suitable nap entirely across the inseam and welt for the reception of sole affixing cement, and which also serves to finish and level the inseam and welt materials so that they are able to lie flat against a mating flat outsole. Following this roughing operation, the shank portion of the welt is rolled against the sides of the lasted upper so that it is adapted to be supported by the last during the sole affixing operation. These steps place the upper in admirable condition for the reception and cement attachment of an outsole, and enable provision of a superior finished shoe.

Referring more particularly to the drawings, the apparatus for carrying out these steps comprises a hollow head 10 mounted on a suitable pedestal 11. An arm 12 is pivotally mounted on a pin 13 affixed to a wall of said head. The pin 13 also has freely rotatable thereon a double pulley comprising a portion 14 which is adapted to be driven by a belt from a suitable motor (not shown) and a portion 15 which is adapted to be belt attached in driving relation with a pulley 16 which is fixed to the driving shaft of a rotatable rasping tool, hereinafter described. The arm 12 is pulled downwardly toward a work support, hereinafter described, by means of a tension spring 17 acting between it and the head 10. The extent of such downward movement is controlled by an adjusting screw 18 which is threaded through the arm 12 so as to have its lower end arrested by a block 19 which is pivotally mounted at 20 upon the head. This block is supported against downward movement under the influence of the spring urged adjusting screw 18 by means of a stop lug 21 that projects integrally from the head 10. A link 22 is pivotally attached to the forward end of the block or lever 19 and is adapted to be operated by a treadle (not shown) so as to elevate the adjusting screw 18 and arm 12 and its associated parts when desired.

The forward end of the arm 12 is provided with a bearing housing 23 containing bearing races (Fig. 3) which rotatably support a shaft 24 which has the driven pulley 16 keyed thereto. The other end of shaft 24 has keyed thereto a rotatable rasping and beating tool 25 which is adapted to trim the excess materials at the inseam of a welted upper. This tool comprises a heavy metal disk which is adapted to have considerable momentum when rotated at fairly high speed. Its peripheral portion has a series of heavy knives 26 each comprising a forward face 27 which is located approximately or exactly in a plane containing a radius of the tool or disk, and an outer face 28 which is cut back slightly from the outside circumference of the tool as indicated at 29 (Fig. 2). This face 28 is convex (Fig. 3) being shaped so that it approaches the work most closely near its outside edge at 30, while from this point it is cut back so that its opposite or inner edge freely clears the welt which it is adapted to overlie. The faces 27 and 28 of the several knives thus meet in curved cutting or chipping edges which, when rapidly rotated, are adapted to remove excess material at the inseam with a rasping action, and these heavy knives are also of such a nature that they knock or beat the inseam materials with a flattening effect while rasping them so that a very close trim can be effected. The effects of this action are indicated in Figs. 6 and 7 where a welted upper having excess lasting material 31 (Fig. 6) is trimmed by means of the tool 25 to the condition illustrated in Fig. 7. Because of the transverse curvature of the knives 26, the inseam trim is somewhat deeper at 32 than at 33, thus in a sense paralleling the somewhat sloping stitch and assuring the retention of sufficient welt material to assure secure affixation to the insole lip and upper and to avoid undesired breaking of the stitches by the tool. The inseam material at 33, it will be noted, may sometimes be left projecting slightly above the bottom face of the welt, while the portion at 32 is substantially even therewith.

A work support, which is preferably power driven, is provided beneath the cutting or rasping face of the tool 25 and is constructed so as to enter the welt crease of the shoe and to aid in holding of the welt and inseam thereagainst. This support includes a vertically extending housing 34 which is attached to the forward part of head 10. It has an internal journal for a rotatable shaft 35. A work supporting disk 36 is keyed to such shaft for rotation therewith and has a thin edge which is adapted to extend below the tool 25 and into the welt crease of an upper to support and locate the same with referance to the cutting edge of the tool. The vertical position of the latter with reference to the work support is determined by the adjusting screw mechanism at 18. The lower end of shaft 35 is provided with a gear 37 which meshes with a worm gear 38 mounted on a shaft 39 which is rotatably journaled in the housing 34 and has a pulley 40 thereon which is adapted to be driven from the motor drive shaft (not shown). The ratio of gears 37 and 38 and of the various interconnected pulleys is preferably such that the tool 25 and work feed and support 36 may be driven from a common motor at properly proportioned speeds to secure the desired trimming action.

The shaft 39 is extended outwardly to one side of the machine, and this extending portion is polygonally sectioned so as to have a number of flat sides. This flat-sided rotating shaft section is adapted to be used as a rolling tool for forcing the shank portion of the welt down against the lasted upper after a further roughing operation, about to be described.

In Fig. 5, there is shown the upper portion of a machine which may be constructed exactly in accordance with the trimming machine structure thus far described, except that its tool shaft 24 has keyed thereto a rotatable roughing tool 41 which is preferably of stiff wire bristle construction, although other forms of roughers, such as those sometimes used for roughing uppers, may be employed. The roughing periphery of this tool is of such a width that it overlies the entire welt and trimmed inseam materials. The shoe, after being trimmed in the manner described above, is held by the operator with its welt resting on support 36 (Fig. 5) with the inseam and welt both in roughing contact with the tool, and the entire welt is fed therebeneath from one welt butt completely around the forepart of the shoe and back to the welt butt on the other side of the shoe. This roughing operation simultaneously picks up the fibers at the cement receiving surface of the welt and also along the inseam, rendering them well suited to cement reception, and in addition, it levels the welt material at 33 if such is projected beyond the sole engaging face of the welt, thus forming (Fig. 8) a flat sole contacting surface, the roughed parts 32, 33' and 42 of which are all relatively flush or even.

The upper as thus far treated is ready for cement affixation to an outsole, which preferably has its marginal portion opposite the inseam and welt portions of the upper similarly roughed and coated with cement.

The hollow head 10 may desirably have a suction blower (not shown) attached to a neck 43 which communicates with the interior thereof, and its forward face adjacent the rasping or roughing tools is open, so that dust formed by these operations may be collected. A side wall of the housing is suitably coped as at 44, to allow free manipulation of the work.

In constructing a shoe in accordance with the present method and with the present apparatus, a welted upper is stitch lasted in accordance with the conventional construction shown in Fig. 6 and after sewing is preferably pounded to compel the welt to assume an outstanding position throughout its entire extent. The inseam is then trimmed with the rasping and beating tool 25 by chipping, tearing and beating the excess lasting materials beyond the inseam under the action of the knives 26, leaving the shoe in the condition shown in Fig. 7 with the inseam trimmed quite closely to the inseam stitches. If needed, a suitable amount of filler material (not shown) is packed within the very slight remaining inseam rib and the inseam and welt are thereafter roughed with the tool 41. This roughing operation removes any excess filler material which may have gotten on the inseam and welt. Since this material is usually not compatible with the cement used to affix the outsole, its removal from this portion of the shoe at this time is desirable. The shank portions only of the shoe are next rolled by the flat-sided shaft 39 until they are forced down against the sides of the lasted upper. The roughed surfaces of the inseam and welt are coated with an adhesive, such as pyroxylin cement, which may be allowed to dry and subsequently reactivated or may be applied just prior to sole affixing, as desired. If permitted to dry, the cement may be applied prior to the shank rolling operation just described. A suitable outsole (not shown), having its marginal portion opposite said inseam and welt portions similarly roughed and coated with cement, is located against the bottom of the prepared upper and the shoe assembly is placed in a suitable sole affixing press, preferably of a type having a flexible pressure applying pad. Preferred forms of presses are shown, for example, in the copending applications of William C. Card, Jr., Serial Nos. 748,980 and 748,981, which are provided with suitable means for holding the forepart portion of the welt down against the outsole as pressure is applied to the bottom of the latter. The flexible press pad urges such outsole up against the cemented inseam and the supported forepart portion of the welt and also curls it up into pressing contact with the rolled shank portion of the welt, which portion is supported by the shoe last. When the cement sets, the shoe is ready for final finishing operations, such as edge setting, burnishing, heel affixing, etc.

A shoe constructed in accordance with these steps has a much closer inseam trim than those heretofore manufactured, with consequent increased flexibility due to the substantial absence of upstanding materials at the inseam. The apparatus provided makes the carrying out of these steps comparatively easy, and enables the operators quickly to prepare the shoe upper for the cement sole attaching operations. The cement affixation of the outsole provides advantages such as freedom from channel peeling, and reductions in the time required by the sole affixing operation. Thus it will be seen that an advantageous method and apparatus have been provided which are well suited to perform their intended functions. While particular embodiments of the invention have been described in some detail, it will be clear that various changes may be made without departing from its purview. Thus, some benefits may be obtained by adopting only some among the steps disclosed, or by using some or one of these steps in combination with other known or desired treating methods.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Apparatus for treating a shoe upper having a welt and upper stitched along an inseam to an upstanding rib on an insole, which comprises, a heavy metal disk having a plurality of knocking and chipping knives along its periphery, each knife having a forwardly directed face and a peripheral face intersecting said forwardly directed face along a cutting edge, said peripheral face rearwardly of said cutting edge being sloped inwardly toward the center of said disk, and also being laterally curved so as to approach flat work more closely at one side of said disk than at the other, means for driving said disk, means for supporting and guiding the inseam portion of said shoe upper in the path of said chipping knives, means for lifting said disk away from said supporting and guiding means, and spring means urging said disk toward said supporting and guiding means.

2. Apparatus for treating a shoe upper having a welt and upper stitched along an inseam to an upstanding rib on an insole, which comprises, a heavy metal disk having a plurality of knocking and chipping knives along its periphery, means for rotating said disk, a work support arranged to hold and guide the inseam portion of said upper in the path of said knives, means for lifting said disk away from said support, and spring means urging said disk toward said support.

3. Apparatus for treating a shoe upper having a welt and upper stitched along an inseam to an upstanding rib on an insole, which comprises, a heavy metal disk having a plurality of knocking and chipping knives along its periphery, means for rotating said disk, a rotatable work support arranged to hold and guide the inseam portion of said upper in the path of said knives, means for rotating said support at a determinedly proportional rate with respect to that of the disk, means for lifting said disk away from said support, and spring means urging said disk toward said support.

4. Apparatus for treating a shoe upper having a welt and upper stitched along an inseam to an upstanding rib on an insole, which comprises, a metal disk having a plurality of chipping knives along its periphery, means for rotating said disk, a work support arranged to hold and guide the inseam portion of said upper in the path of said knives, means for adjusting the position of said disk with respect to said support, means including said adjusting means for lifting said disk away from said support, and spring means urging said disk toward said support to the extent permitted by said adjusting means.

5. Apparatus for treating a shoe upper having a welt and upper stitched along an inseam to an upstanding rib on an insole, which comprises, a head, an arm pivotally mounted thereon, an inseam treating tool rotatably mounted on said arm, a work support rotatably mounted on said head and arranged to hold and guide the inseam of said upper against the working face of said tool, means for driving said tool and support at related speeds, spring means urging said arm and tool toward said support, a lever pivoted to said head, a stop for said lever, an adjusting screw on said arm and contacting said lever to position said tool with respect to said support, and means for moving said lever away from its stop to lift said tool away from said support.

WILLIAM C. CARD, JR.